US012760844B2

(12) United States Patent
Suh et al.

(10) Patent No.: US 12,760,844 B2
(45) Date of Patent: Oct. 13, 2026

(54) HYDROGEN TANK

(71) Applicants: HYUNDAI MOTOR COMPANY, Seoul (KR); KIA CORPORATION, Seoul (KR)

(72) Inventors: Jin Gyo Suh, Hwaseong-si (KR); Kyu Young Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 3 days.

(21) Appl. No.: 18/943,439

(22) Filed: Nov. 11, 2024

(65) Prior Publication Data

US 2025/0383046 A1 Dec. 18, 2025

(30) Foreign Application Priority Data

Jun. 13, 2024 (KR) ........................ 10-2024-0076992

(51) Int. Cl.
*F17C 13/00* (2006.01)

(52) U.S. Cl.
CPC .... *F17C 13/002* (2013.01); *F17C 2201/0109* (2013.01); *F17C 2205/0305* (2013.01); *F17C 2221/012* (2013.01); *F17C 2260/023* (2013.01); *F17C 2265/06* (2013.01)

(58) Field of Classification Search
CPC .......... F17C 5/00; F17C 13/00; F17C 13/002; F17C 2201/0109; F17C 2205/0305; F17C 2221/012; F17C 2260/023; F17C 2265/06
See application file for complete search history.

(56) References Cited

U.S. PATENT DOCUMENTS

| | | | | |
|---|---|---|---|---|
| 8,267,268 B2 * | 9/2012 | Friedlmeier | F17C 5/06 | 220/4.12 |
| 9,802,480 B2 * | 10/2017 | Komiya | F17C 13/04 | |
| 11,079,068 B2 * | 8/2021 | Jayaraman | F17C 5/06 | |
| 2009/0178555 A1 * | 7/2009 | Crits | C02F 1/004 | 95/24 |
| 2010/0032934 A1 * | 2/2010 | Veenstra | B60K 15/013 | 141/82 |
| 2010/0155404 A1 * | 6/2010 | Friedlmeier | F17C 5/06 | 141/1 |

(Continued)

FOREIGN PATENT DOCUMENTS

| | | |
|---|---|---|
| KR | 20170118510 A | 10/2017 |
| KR | 102054212 B1 | 1/2020 |

(Continued)

*Primary Examiner* — Nicolas A Arnett
(74) *Attorney, Agent, or Firm* — Lempia Summerfield Katz LLC

(57) ABSTRACT

A hydrogen tank includes a tank body, a boss connected to at least one end of the tank body and having a skirt extending radially with respect to an axial direction of the tank body, and a nozzle installed inside the tank body via the boss and configured to spray hydrogen gas at a predetermined angle with respect to the axial direction of the tank body. The nozzle includes a connector coupled to the boss, an extension portion extending from the connector parallel to the axial direction of the tank body, an inclined portion connected to an end portion of the extension portion and inclined with respect to the axial direction of the tank body, and an injection member provided at an end portion of the inclined portion.

16 Claims, 7 Drawing Sheets

(56) References Cited

U.S. PATENT DOCUMENTS

| | | | | |
|---|---|---|---|---|
| 2019/0346083 | A1* | 11/2019 | Shubbar ................. | B65D 90/46 |
| 2023/0238550 | A1* | 7/2023 | Jung ................. | B01F 25/31252 |
| | | | | 429/415 |

FOREIGN PATENT DOCUMENTS

| | | | |
|---|---|---|---|
| KR | 102432512 | B1 | 8/2022 |
| KR | 20230152207 | A | 11/2023 |
| KR | 20230152878 | A | 11/2023 |

* cited by examiner

HYDROGEN TANK

CROSS-REFERENCE TO RELATED APPLICATION(S)

This application claims benefit of priority to Korean Patent Application No. 10-2024-0076992 filed on Jun. 13, 2024 in the Korean Intellectual Property Office, the disclosure of which is incorporated herein by reference in its entirety.

TECHNICAL FIELD

The present disclosure relates to a hydrogen tank capable of improving internal thermal stratification and prevent overheating when filled with hydrogen gas.

BACKGROUND

Generally, a hydrogen tank used in a fuel cell vehicle is used to supply hydrogen gas to a polymer electrolyte fuel cell producing electricity required for operation of the vehicle. A hydrogen tank may have a double structure. For example, the hydrogen tank may include a cylinder-shaped liner formed of a polymer, such as nylon, and an outer tube formed of a carbon composite provided on the outside of the liner and may withstand a pressure of 35 megapascal (MPa) or more.

In addition, the hydrogen tank may further include a boss provided at both ends thereof to connect the liner and the outer tube and a valve inserted into the boss at one end of the hydrogen tank to form a flow path for filling and discharging hydrogen gas. A straight nozzle is disposed to protrude from the valve into the inside of the hydrogen tank. When the hydrogen tank is filled with hydrogen gas, the valve is opened by a pressure difference and hydrogen gas is injected into the hydrogen tank through the straight nozzle inside the valve.

In the case of a straight nozzle, when a high-capacity hydrogen tank is filled with hydrogen gas, thermal stratification of hydrogen gas may occur within the hydrogen tank. In other words, hydrogen gas having high temperature and low density is located in an upper portion of the hydrogen tank and hydrogen gas having high temperature and low density is located in a lower portion thereof. As a result, filling efficiency may decrease, and the hydrogen tank may be filled with less hydrogen gas than the maximum capacity of the hydrogen tank.

In addition, due to thermal stratification of hydrogen gas within the hydrogen tank, hydrogen gas is not mixed but separated and the temperature of the upper portion of the hydrogen tank increases continuously, so the filling has to be temporarily stopped during the filling to prevent overheating of the upper portion of the hydrogen tank. Accordingly, a temperature sensor has to be applied to the hydrogen tank, a filling time may increase, and costs may be incurred.

SUMMARY

An aspect of the present disclosure is to provide a hydrogen tank capable of improving internal thermal stratification and preventing overheating of the tank when filled with hydrogen gas.

According to an aspect of the present disclosure, a hydrogen tank includes a tank body, a boss connected to at least one end of the tank body and having a skirt extending radially with respect to an axial direction of the tank body, and a nozzle installed inside the tank body via the boss and formed to spray hydrogen gas at a predetermined angle with respect to the axial direction of the tank body. The nozzle includes a connector coupled to the boss, an extension portion extending from the connector parallel to the axial direction of the tank body, an inclined portion connected to an end portion of the extension portion and inclined with respect to the axial direction of the tank body, and an injection member provided at an end portion of the inclined portion.

The skirt may have an inward surface formed toward an inside of the tank body. The inward surface may have an inclined surface inclined at a first inclination angle with respect to a direction perpendicular to the axial direction of the tank body.

The extension portion may have an extension portion length, and the extension portion length may be determined by $l_e = r_s/\cos\Psi_1$ wherein $l_e$ may be the extension portion length, $r_s$ may be a skirt radius, $\Psi_1$ is the first inclination angle, and the skirt radius may be defined as a shortest distance from a radial outermost edge of the skirt to an axial center line of the tank body.

The inclined portion may have an inclined portion length, and the inclined portion length extending in a sloped state may have the same value as the extension portion length.

The inclined portion may be inclined at a second inclination angle with respect to the axial direction of the tank body, and the second inclination angle may be in a range of 1.3-1.7 times the first inclination angle.

The hydrogen tank may be positionable such that the axial direction of the tank body is horizontal, and the inclined portion is inclined toward an upper portion of the tank body.

The hydrogen tank may include a marking portion that is mounted on an external surface of the tank body and is configured to distinguish between a top and a bottom of the hydrogen tank.

The injection member may include a plate connected to an end portion of the inclined portion and having a through-hole formed therein, and a diffusion guide extending from an edge of the plate and formed to spread out in a direction away from the plate.

The diffusion guide may be inclined so that an internal surface of the diffusion guide has a third inclination angle with respect to a surface of the plate. The third inclination angle may have a range of 120-140°.

The injection member may include a connecting body connected to an end portion of the inclined portion, a main hole formed in the axial direction inside the connecting body, and a plurality of branch holes formed to be branched off and inclined from the main hole inside the connecting body.

The plurality of branch holes may be arranged at equal intervals in a circumferential direction of the connecting body.

The branch hole may be inclined at a fourth inclination angle having the same value as the first inclination angle with respect to an axial direction of the connecting body.

According to another aspect of the present disclosure, a hydrogen tank includes a tank body, a boss connected to at least one end of the tank body and having a skirt extending radially with respect to an axial direction of the tank body, and a nozzle installed inside the tank body via the boss and configured to spray hydrogen gas at a predetermined angle with respect to the axial direction of the tank body. The nozzle includes a connector coupled to the boss, an extension portion extending from the connector parallel to the axial direction of the tank body, and a changing member provided at an end portion of the extension portion.

The extension portion may have an orifice formed therein, and the orifice may have an inner diameter gradually increasing toward the inside of the tank body.

The changing member may include a rod formed to be inserted into the orifice, and a diffuser plate fixedly coupled to an end portion of the rod. A spray flow path may be defined between an external surface of the rod and an internal surface of the orifice.

The rod may include a plurality of support protrusions spaced apart at equal intervals in a circumferential direction of the rod on the external surface of the rod and extending in a length direction of the rod.

The rod may be press-fitted and coupled to the orifice.

The diffuser plate may be coupled to extend at a right angle with respect to a length direction of the rod, and the diffuser plate may have an area larger than a cross-sectional area of the orifice.

BRIEF DESCRIPTION OF DRAWINGS

The above and other aspects, features, and advantages of the present disclosure should be more clearly understood from the following detailed description, taken in conjunction with the accompanying drawings, in which.

DETAILED DESCRIPTION

Figure 1:
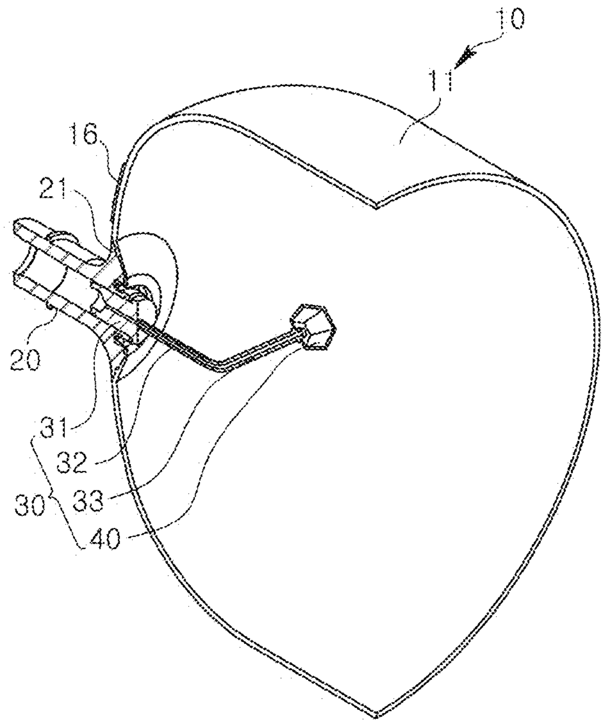
FIG. 1 is a partially cutaway perspective view of a hydrogen tank according to a first embodiment of the present disclosure.

In this specification, vehicles refer to a variety of vehicles that move transported objects, such as people, animals, or goods, from a starting point to a destination. These vehicles are not limited to vehicles that run on roads or tracks. In other words, the term vehicle may also be used to encompass mobility devices, such as ships and aircraft.

In addition, terms, such as first, second, and third, may be used to describe various components, but these components are not limited in order, size, location, or importance by terms, such as first, second, and third and are so named for the sole purpose of distinguishing one component from another.

When a component, device, element, or the like of the present disclosure is described as having a purpose or performing an operation, function, or the like, the component, device, or element should be considered herein as being "configured to" meet that purpose or to perform that operation or function.

Hereinafter, the present disclosure is described in detail with reference to the drawings. When adding reference numerals to components in each drawing, it should be noted that identical components are given the same reference numerals as much as possible although they are shown in different drawings.

Figure 2:
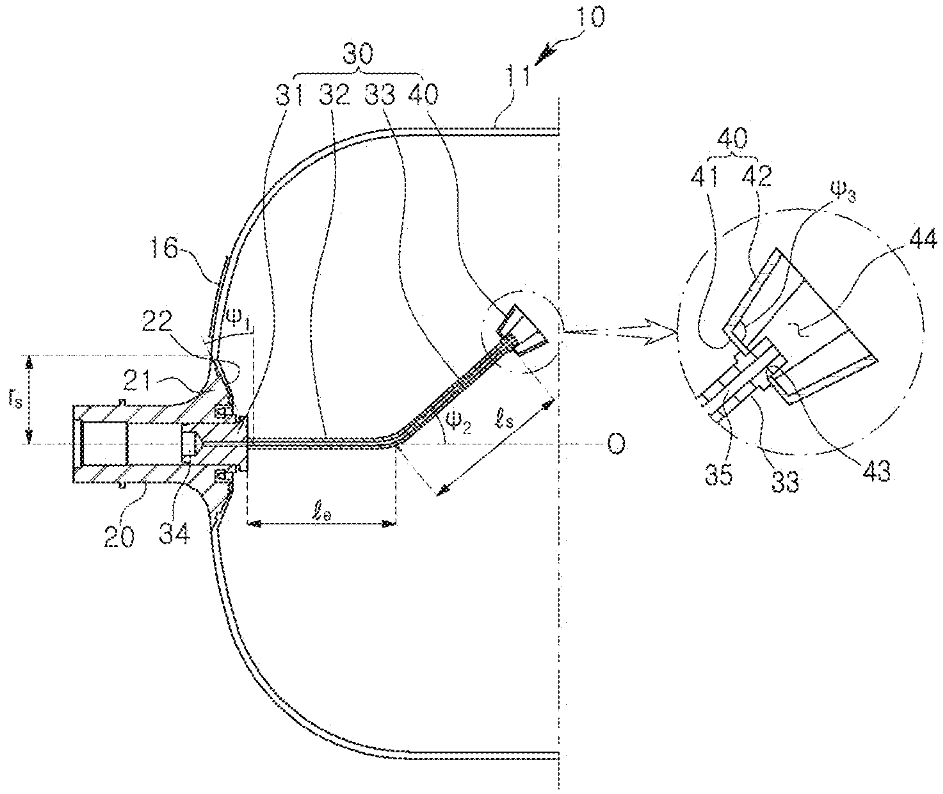
FIG. 2 is a partial cross-sectional view of a hydrogen tank and an enlarged view of an injection member to explain a hydrogen tank according to the first embodiment of the present disclosure.

FIG. 1 is a partially cutaway perspective view of a hydrogen tank according to a first embodiment of the present disclosure. FIG. 2 is a partial cross-sectional view of a hydrogen tank and an enlarged view of an injection member to explain a hydrogen tank according to the first embodiment of the present disclosure.

A hydrogen tank according to the first embodiment of the present disclosure may include a tank body 10, a boss 20, and a nozzle 30.

The hydrogen tank may be used, for example, to supply hydrogen gas to a polymer electrolyte fuel cell to produce electricity necessary for operating a fuel cell vehicle.

The tank body 10 may include a liner 11 having a cylindrical shape (see FIG. 3) and forming the interior of the hydrogen tank and an outer tube 12 provided on the outside of the liner 11 to form the exterior of the hydrogen tank. For example, the liner 11 may be formed of a polymer material, such as nylon, and the outer tube 12 may be formed of a carbon composite. However, the configuration and material of the tank body 10 are not limited to the aforementioned example.

The boss 20 may be coupled to at least one end of the tank body 10 to connect the liner 11 to the outer tube 12 and integrate the inside and outside of the tank body 10. For example, the boss 20 may be integrated with the liner 11 of the tank body 10 by insert injection molding.

For example, the boss 20 may be formed of a solid material, such as a metal, such as aluminum or an alloy thereof, and may be formed as a roughly tubular member. On an inner circumferential surface of the boss 20, a female screw thread for coupling a nozzle 30, a valve, and the like may be formed at least partially, and a sealing member (not shown) for maintaining airtightness may be selectively provided.

In addition, the boss 20 may include a skirt 21 formed to extend radially with respect to an axial direction of the tank body 10 and contact the liner 11 of the tank body 10. The skirt 21 may be fixed while being joined to the liner 11 when the boss 20 is insert injection-molded.

The skirt 21 may have an inward surface 22 formed toward an inside of the tank body 10, and the inward surface 22 may have an inclined surface inclined at a predetermined first inclination angle $\Psi_1$ with respect to a direction perpendicular to the axial direction of the tank body 10. For example, in a case in which the inward surface 22 is perpendicular to the axial direction of the tank body 10 without an inclined surface, the first inclination angle may be replaced with 0°.

In addition, the skirt 21 may have a skirt radius $r_s$ defined as the shortest distance from the radially outermost edge of the skirt 21 to an axial center line O of the tank body 10.

Depending on a size of the boss 20, i.e., the skirt radius $r_s$ and the first inclination angle $\Psi_1$ of the skirt 21, a shape of a dome portion of the tank body 10 may vary, and a volume of the tank body 10 may be changed.

In addition, a valve (not shown) may be inserted into and installed in the boss 20 to form a flow path connecting the inside and outside of the tank body 10, and the flow path may be opened and closed. Through the flow path in the valve, hydrogen gas may fill the tank body 10 and be discharged from the tank body 10. The valve may be connected to the boss 20, for example, by a screw connection method, but the connection method is not limited thereto.

As the valve, a solenoid valve automatically opening and closing the flow path according to an electric signal may be used but is not limited thereto. Selectively, at least one of an excess flow prevention valve and a check valve may be further included in the valve.

In addition, an end plug 15 (see FIG. 3) may be provided at the other end of the tank body 10, i.e., the opposite end portion of the valve. The end plug 15 may be inserted into the boss 20 connected to the other end of the tank body 10 to close the other end of the tank body 10.

The nozzle 30 may be installed inside close to one end of the tank body 10 via the boss 20 and may be formed to spray hydrogen gas at a predetermined angle with respect to the axial direction of the tank body 10 inside the tank body 10. The nozzle 30 may be connected to the flow path inside the valve.

In the hydrogen tank according to the first embodiment of the present disclosure, the nozzle 30 may include a connector 31 coupled to the boss 20, an extension portion 32 extending parallel to the axial direction of the tank body 10 from the connector 31, an inclined portion 33 connected to an end portion of the extension portion 32 and inclined with respect to the axial direction of the tank body 10, and an injection member 40 provided at an end portion of the inclined portion 33.

The connector 31 may have a hollow portion 34 inside and may have at least a partially formed male screw thread on an outer circumferential surface for coupling with the boss 20. As a result, the connector 31 may be screw-coupled to the boss 20. The hollow portion 34 may communicate with the flow path inside the valve and may have an inner diameter gradually decreasing toward the inside of the tank body 10. Selectively, a sealing member may be interposed between the outer circumferential surface of the connector 31 and the inner circumferential surface of the boss 20 to maintain airtightness.

The extension portion 32 and the inclined portion 33 may be formed as thin tubular members and may have an outer diameter significantly smaller than an outer diameter of the connector 31. The extension portion 32 and the inclined portion 33 may be located in an internal volume of the tank body 10.

At least the connector 31, the extension portion 32, and the inclined portion 33 may be integrally formed to form the nozzle 30. A portion of the nozzle 30 may be bent or curved at a predetermined angle with respect to a longitudinal direction of the extension portion 32 (i.e., the axial center line of the tank body 10) at any point to form the inclined portion 33. An orifice 35 having a predetermined diameter and communicating with the hollow portion 34 of the connector 31 may be formed within the extension portion 32 and the inclined portion 33.

The extension portion 32 may have a predetermined extension portion length $l_e$, and the extension portion length $l_e$ may be determined by Equation 1 below.

$$l_e = r_s/\cos\Psi_1 \quad \text{Equation 1}$$

In this example, $r_s$ is the skirt radius, and $\Psi_1$ is the first inclination angle of the inward surface 22 of the skirt 21.

The inclined portion 33 may extend from the extension portion 32 while being inclined toward one side of the tank body 10. For example, when the hydrogen tank is laid down so that the axial direction of the tank body 10 is horizontal, the inclined portion 33 may be inclined toward the upper portion of the tank body 10.

The inclined portion 33 may be inclined at a predetermined second inclination angle $\Psi_2$ with respect to the axial direction of the tank body 10, and the second inclination angle $\Psi_2$ may be determined by Equation 2 below.

$$1.3\Psi_1 \le \Psi_2 \le 1.7\Psi_1 \quad \text{Equation 2}$$

In other words, the second inclination angle $\Psi_2$ may have a range of 1.3-1.7 times the first inclination angle $\Psi_1$ of the inward surface 22 of the skirt 21. This range is an optimal value determined by analysis through simulation and experiment.

In addition, the inclined portion 33 may have a predetermined inclined portion length $l_s$, and the inclined portion length $l_s$ may be determined by Equation 3 below.

$$l_s = l_e = r_s/\cos\Psi_1 \quad \text{Equation 3}$$

In other words, the inclined portion length $l_s$ extended in a sloped state may have the same value as the extension portion length $l_e$. This value is an optimal value determined by analysis through simulation and experiment.

In this manner, by adjusting the extension portion length $l_e$ of the extension portion 32 of the nozzle 30 and the second inclination angle $\Psi_2$ and the inclined portion length $l_s$ of the inclined portion 33 according to the size of the boss 20, i.e., the skirt radius $r_s$ and the first inclination angle $\Psi_1$ of the skirt 21, hydrogen gas sprayed from the injection member 40 through the inclined portion 33 may be guided by an inner wall of the tank body 10 to form a loop circulating throughout the interior of the tank body 10. Ultimately, in this way the uniformity of a temperature distribution in the hydrogen tank may be improved.

In the hydrogen tank according to the first embodiment of the present disclosure, at least a portion of the valve and a portion of the nozzle 30 may be integrally formed. For example, the valve body of the valve and the connector 31 of the nozzle 30 may be integrally formed and connected to each other. A valve member, a solenoid, and the like may be assembled to the valve body, and the injection member 40 may be coupled to the inclined portion 33.

In this manner, since the valve and nozzle 30 may be integrated, the hydrogen tank according to the first embodiment of the present disclosure may improve workability by reducing the number of parts and man-hours.

Since the inclined portion 33 of the nozzle 30 extends in an inclined manner toward the upper portion of the tank body 10, directionality of the hydrogen tank may be created. Accordingly, after the nozzle 30 is installed on the boss 20, a marking portion 16 for distinguishing between top and bottom may be mounted on an external surface of the tank body 10. The marking portion 16 may be formed in the form of a sticker, for example, and attached to the upper portion of the tank body 10, or paint may be applied in the form of a specific symbol or character and printed on the upper portion of the tank body 10.

In this case, the completed hydrogen tank according to the first embodiment of the present disclosure has to be mounted and fixed, while maintaining a posture thereof so that the marking portion 16 is located upward when installed in the vehicle.

The injection member 40 may include a plate 41 coupled to an end portion of the inclined portion 33 and having a through-hole 43 formed therein, and a diffusion guide 42 formed to extend from an edge of the plate 41 and spread out in a direction away from the plate 41.

The injection member 40 may be manufactured separately and may be fixedly coupled by a method, such as screw fastening or welding, after the through-hole 43 of the plate 41 is fitted to the end portion of the inclined portion 33. However, the method of coupling the injection member 40 is not limited thereto.

An internal space 44 of the injection member 40, i.e., a space 44 partitioned by the diffusion guide 42, may communicate with the orifice 35 of the inclined portion 33.

The diffusion guide 42 may be formed and configured to guide a traveling direction of the hydrogen gas at the moment when the hydrogen gas sprayed from the orifice 35 of the inclined portion 33 is widely spread out.

The diffusion guide 42 may be formed of a plate material to have an approximate cone shape. For example, the diffusion guide 42 may be formed in a cone shape having a hexagonal cross-section, but the diffusion guide 42 is not limited thereto and may have any polygonal, circular, elliptical, or other cross-sectional shape.

The diffusion guide 42 may be formed to extend from the edge of the plate 41 so that the internal surface of the diffusion guide 42 is inclined at a predetermined third inclination angle $\Psi_3$ with respect to the surface of the plate 41.

The third inclination angle $\Psi_3$ may have a range of 120-140°. For example, if the third inclination angle $\Psi_3$ is less than 120°, the hydrogen gas cannot be sufficiently spread out, and thus the hydrogen gas cannot be smoothly distributed. If the third inclination angle $\Psi_3$ exceeds 140°, the hydrogen gas may not reach the internal surface of the diffusion guide 42, and thus there is no effect of guiding the hydrogen gas in a desired direction.

According to the third inclination angle $\Psi_3$ of the diffusion guide 42, an injection angle of the hydrogen gas injected through the nozzle 30 may be determined.

Therefore, by appropriately adjusting the third inclination angle $\Psi_3$ of the diffusion guide 42 together with the second inclination angle $\Psi_2$ between the extension portion 32 and the inclined portion 33, the nozzle 30 in the hydrogen tank according to the first embodiment of the present disclosure may evenly distribute and inject the hydrogen gas introduced through the valve and sprayed from the orifice 35 and the diffusion guide 42 into the tank body 10.

The hydrogen tank according to the first embodiment of the present disclosure obtains the advantage of suppressing thermal stratification within the hydrogen tank and improving the uniformity of a temperature distribution during filling of hydrogen gas by applying the nozzle 30 forming a predetermined injection angle inside the hydrogen tank.

Figure 3A:
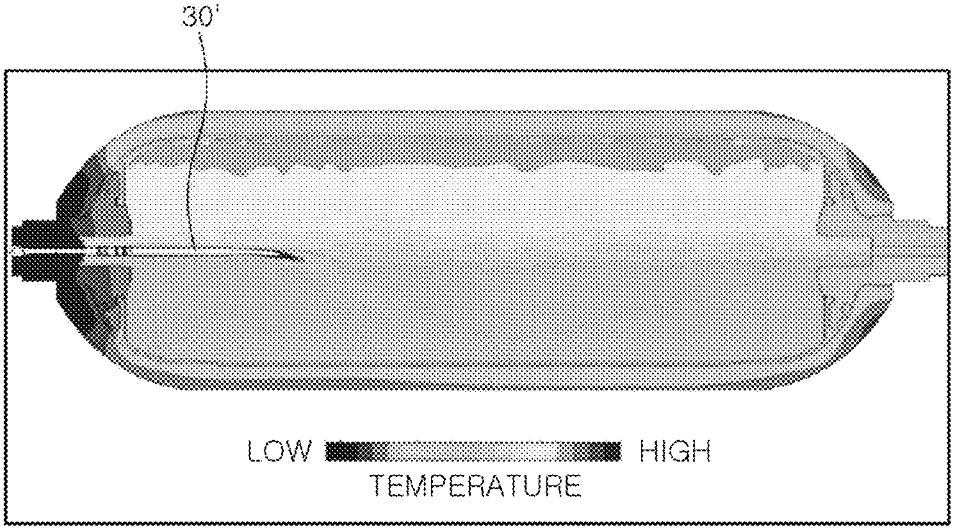
FIGS. 3A and 3B are drawings illustrating temperature distributions during filling through analysis of a hydrogen tank according to the first embodiment of the present disclosure and the related art.
Figure 3B:
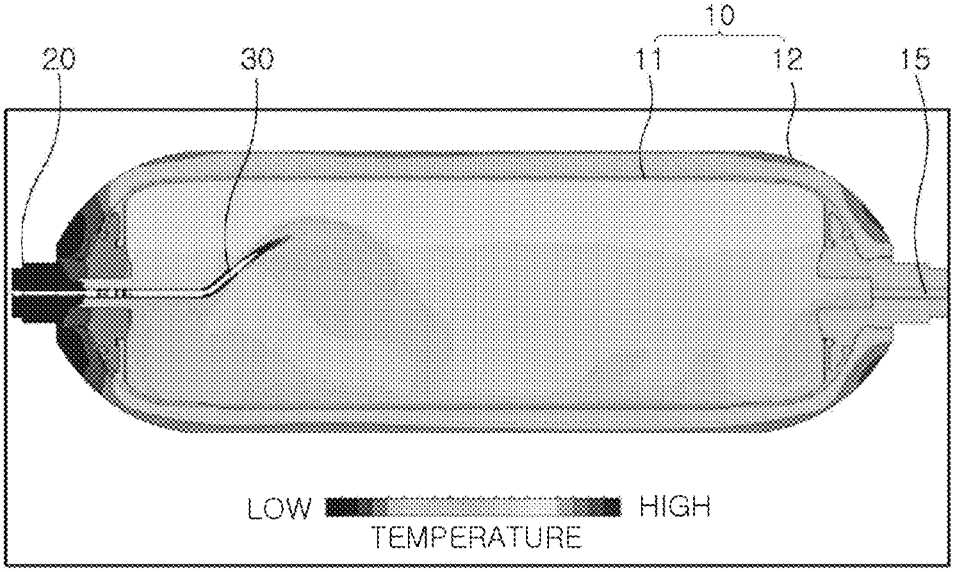

FIGS. 3A and 3B are views illustrating a temperature distribution during filling through analysis of a hydrogen tank according to the related art and the first embodiment of the present disclosure.

Specifically, FIG. 3A is an analysis drawing illustrating a temperature distribution when filling a hydrogen tank with hydrogen gas according to the related art. FIG. 3B is an analysis drawing illustrating a temperature distribution when filling the hydrogen tank with hydrogen gas according to the first embodiment of the present disclosure. An initial temperature of the injected hydrogen gas is −20° C., and an initial pressure is 2 MPa.

It can be seen that, in the hydrogen tank according to the related art (FIG. 3A), a straight nozzle 30' extending parallel to the axial direction of the hydrogen tank from the valve is disposed and thermal stratification of hydrogen gas occurs within the hydrogen tank when filled with hydrogen gas. In other words, hydrogen gas with high temperature and low density is located in the upper portion of the hydrogen tank and hydrogen gas with high temperature and low density is located in the lower portion thereof.

In the hydrogen tank according to the first embodiment of the present disclosure (FIG. 3B), the nozzle 30 having the inclined portion 33 inclined from the extension portion 32 toward the upper portion of the tank body 10 is disposed. When filling the hydrogen tank with the hydrogen gas, the hydrogen gas sprayed from the nozzle 30 may be guided by the inner wall of the tank body 10 and circulate throughout the inside of the tank body 10, so that the temperature inside the hydrogen tank may be uniformly distributed.

Figure 4A:
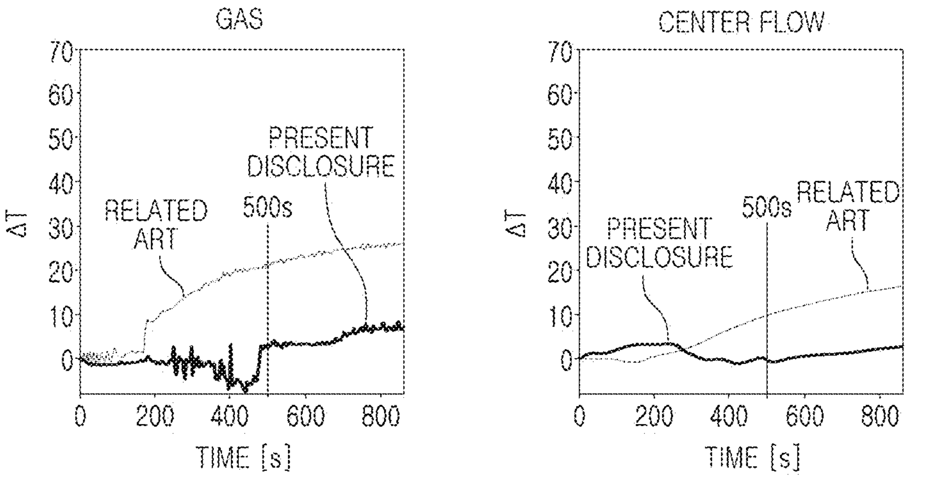
FIGS. 4A and 4B are graphs illustrating a temperature difference over time between the hydrogen tanks according to the first embodiment of the present disclosure and the related art.
Figure 4B:
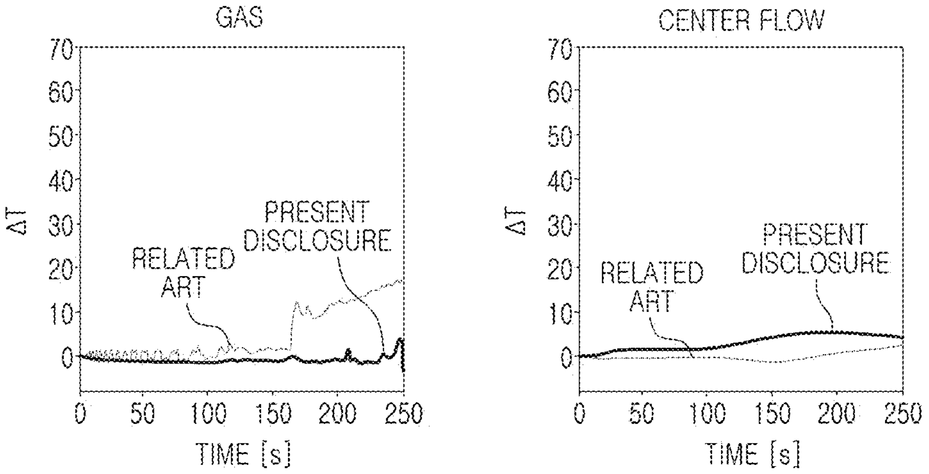

FIGS. 4A and 4B are graphs illustrating a temperature difference over time between the hydrogen tanks according to the related art and the first embodiment of the present disclosure.

Specifically, FIG. 4A are graphs illustrating temperature differences over time between the hydrogen tanks according to the related art and the first embodiment of the present disclosure when an initial upper and lower temperature difference (ΔT) is 30° C. within the corresponding hydrogen tank. FIG. 4B are graphs illustrating temperature differences over time between the hydrogen tanks according to the related art and the first embodiment of the present disclosure when the initial upper and lower temperature difference (ΔT) is 0° C. within the corresponding hydrogen tank.

It can be seen that, when the initial upper and lower temperature difference (ΔT) is 30° C., thermal stratification of hydrogen gas begins for 500 seconds in the hydrogen tank according to the related art, whereas thermal stratification does not occur in the hydrogen tank according to the first embodiment of the present disclosure.

In addition, it can be seen that, when the initial upper and lower temperature difference (ΔT) is 0° C., first, a filling time is significantly shortened, and while thermal stratification of hydrogen gas still occurs in the hydrogen tank according to the related art, thermal stratification may be completely eliminated in the hydrogen tank according to the first embodiment of the present disclosure.

In this manner, the hydrogen tank according to the first embodiment of the present disclosure may include the nozzle 30 capable of dispersing and injecting the filling hydrogen gas, thereby suppressing thermal stratification within the hydrogen tank during filling. Since the temperature distribution within the hydrogen tank is uniform, overheating may be prevented.

In addition, since overheating due to thermal stratification may be prevented in the hydrogen tank according to the first embodiment of the present disclosure, a temperature sensor or the like that monitors the temperature within the hydrogen tank may be eliminated, thereby reducing costs. Furthermore, since overheating may be prevented, a filling speed of the hydrogen gas may be improved, and the hydrogen tank may be utilized at maximum capacity.

Figure 5:
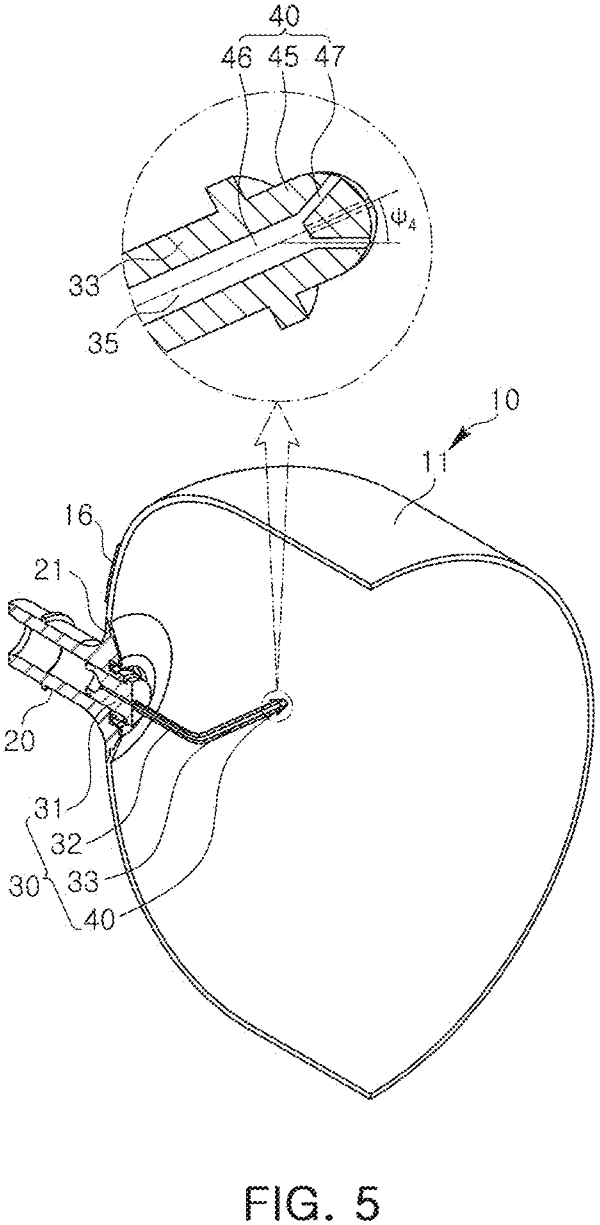
FIG. 5 is a partially cutaway cross-sectional view of a hydrogen tank and an enlarged view of an injection member according to a second embodiment of the present disclosure.

FIG. 5 is a partial cutaway cross-sectional view of a hydrogen tank and an enlarged view of an injection member 40 according to a second embodiment of the present disclosure.

The hydrogen tank according to the second embodiment of the present disclosure may include the tank body 10, the boss 20, and the nozzle 30.

The second embodiment illustrated in FIG. 5 differs only in the configuration of the injection member 40, and the other components are the same as those of the first embodiment. Accordingly, when describing the hydrogen tank of the second embodiment, the same reference numerals are given to the same components as those of the hydrogen tank according to the first embodiment described above, and a detailed description of the configuration and function thereof has been omitted.

The nozzle 30 may be installed inside close to one end of the tank body 10 via the boss 20 and may be formed and configured to spray hydrogen gas at a predetermined angle with respect to the axial direction of the tank body 10 inside the tank body 10. The nozzle 30 may be connected to the flow path inside the valve.

In the hydrogen tank according to the second embodiment of the present disclosure, the nozzle 30 may include the connector 31 coupled to the boss 20, the extension portion 32 extending parallel to the axial direction of the tank body 10 from the connector 31, the inclined portion 33 connected to an end portion of the extension portion 32 and inclined with respect to the axial direction of the tank body 10, and the injection member 40 provided at an end portion of the inclined portion 33.

The injection member 40 may include a connecting body 45 connected to an end portion of the inclined portion 33, a main hole 46 formed in the axial direction inside the connecting body 45, and a plurality of branch holes 47 branched off and inclined from the main hole 46 inside the connecting body 45.

The injection member 40 may be manufactured separately, and the connecting body 45 may be fixedly connected to the end portion of the inclined portion 33 by screwing or welding the connecting body 45. However, the method of connecting the injection member 40 is not limited thereto.

Alternatively, the injection member 40 may be integrally formed with at least the inclined portion 33. For example, the end portion of the inclined portion 33 and the connecting body 45 of the injection member 40 may be integrally formed and connected to each other. Accordingly, since the nozzle 30 may be integrally formed, the hydrogen tank according to the second embodiment of the present disclosure may reduce the number of parts and man-hours, thereby improving workability.

The internal space of the injection member 40, specifically, the main hole 46 in the connecting body 45, may communicate with the orifice 35 of the inclined portion 33.

The plurality of branch holes 47 may be evenly distributed at equal intervals in a circumferential direction of the connecting body 45 and may be formed to have the same diameter. As a result, flow of hydrogen gas passing through the main hole 46 in the connecting body 45 may be distributed.

Each branch hole 47 may be formed to extend from an inner end portion of the main hole 46 and be inclined at a predetermined fourth inclination angle $\Psi_4$ with respect to the axial direction of the connecting body 45 and the inclined portion 33 of the nozzle 30. The fourth inclination angle $\Psi_4$ may have the same value as the first inclination angle $\Psi_1$ of the inward surface 22 of the skirt 21.

According to the fourth inclination angle $\Psi_4$ of the branch hole 47, a spray angle of the hydrogen gas sprayed through the nozzle 30 may be determined.

The hydrogen gas introduced into the nozzle 30 through the valve may pass through the plurality of branch holes 47 of the injection member 40, and then the hydrogen gas may flow in the direction in which each branch hole 47 is directed. As a result, the hydrogen gas may be sprayed radially from the nozzle 30 by the plurality of branch holes 47.

Therefore, by appropriately adjusting the fourth inclination angle $\Psi_4$ of the branch hole 47 together with the second inclination angle $\Psi_2$ between the extension portion 32 and the inclined portion 33, the nozzle 30 in the hydrogen tank according to the second embodiment of the present disclosure may evenly distribute and inject the hydrogen gas introduced through the valve and sprayed from the plurality of branch holes 47 into the tank body 10.

In the hydrogen tank according to the second embodiment of the present disclosure, by applying the nozzle 30 having a predetermined spray angle inside the hydrogen tank, it is possible to suppress thermal stratification inside the hydrogen tank during filling of hydrogen gas and improve the uniformity of a temperature distribution, thereby preventing overheating.

In addition, since overheating due to thermal stratification may be prevented in the hydrogen tank according to the second embodiment of the present disclosure, a temperature sensor or the like: monitors the temperature inside the hydrogen tank may be eliminated, thereby reducing costs. Furthermore, since overheating may be prevented, the filling speed of hydrogen gas may be improved, and the hydrogen tank may be utilized at maximum capacity.

Figure 6:
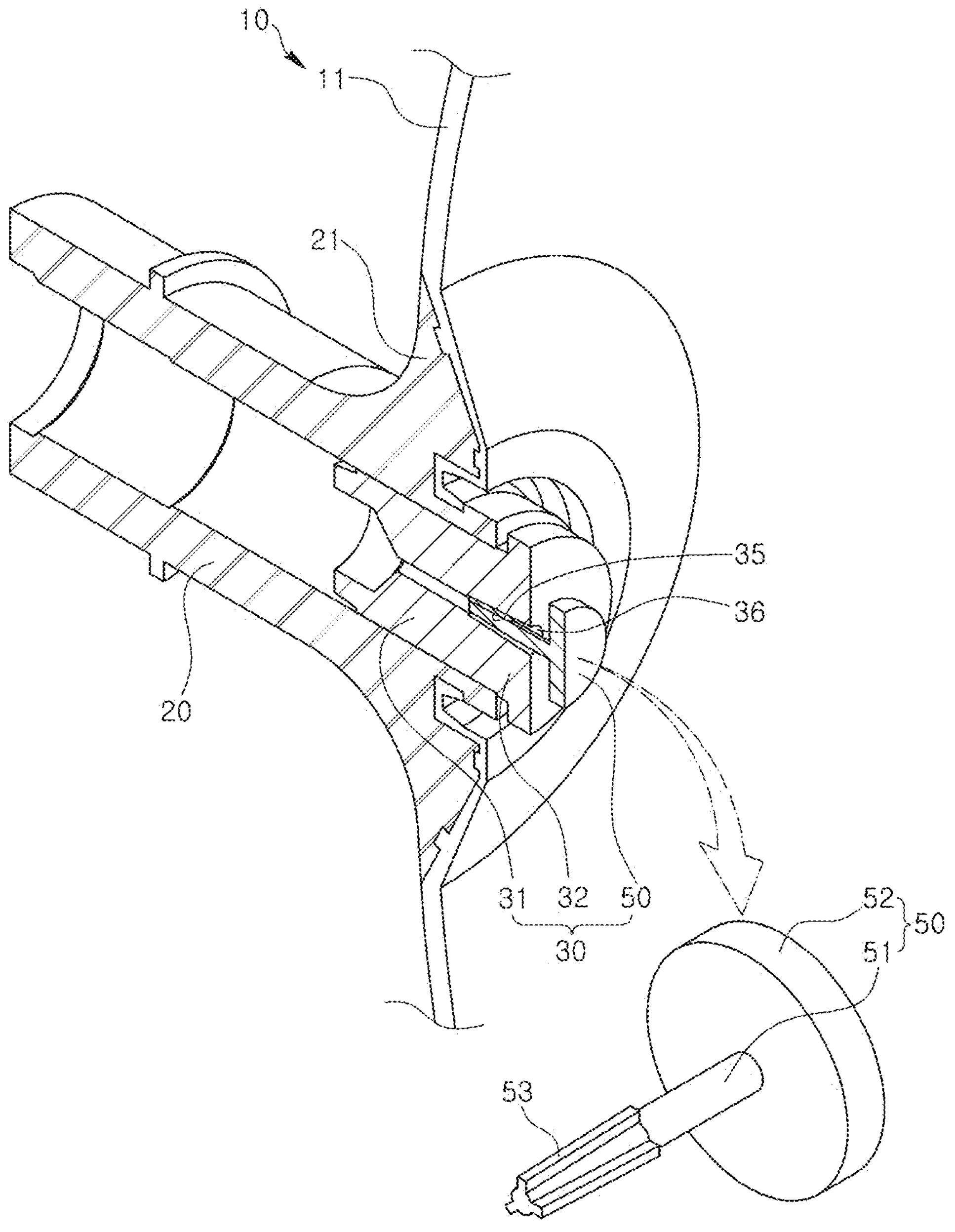
FIG. 6 is a cutaway perspective view of a main portion of a hydrogen tank and an enlarged view of a changing member according to a third embodiment of the present disclosure.
Figure 7:
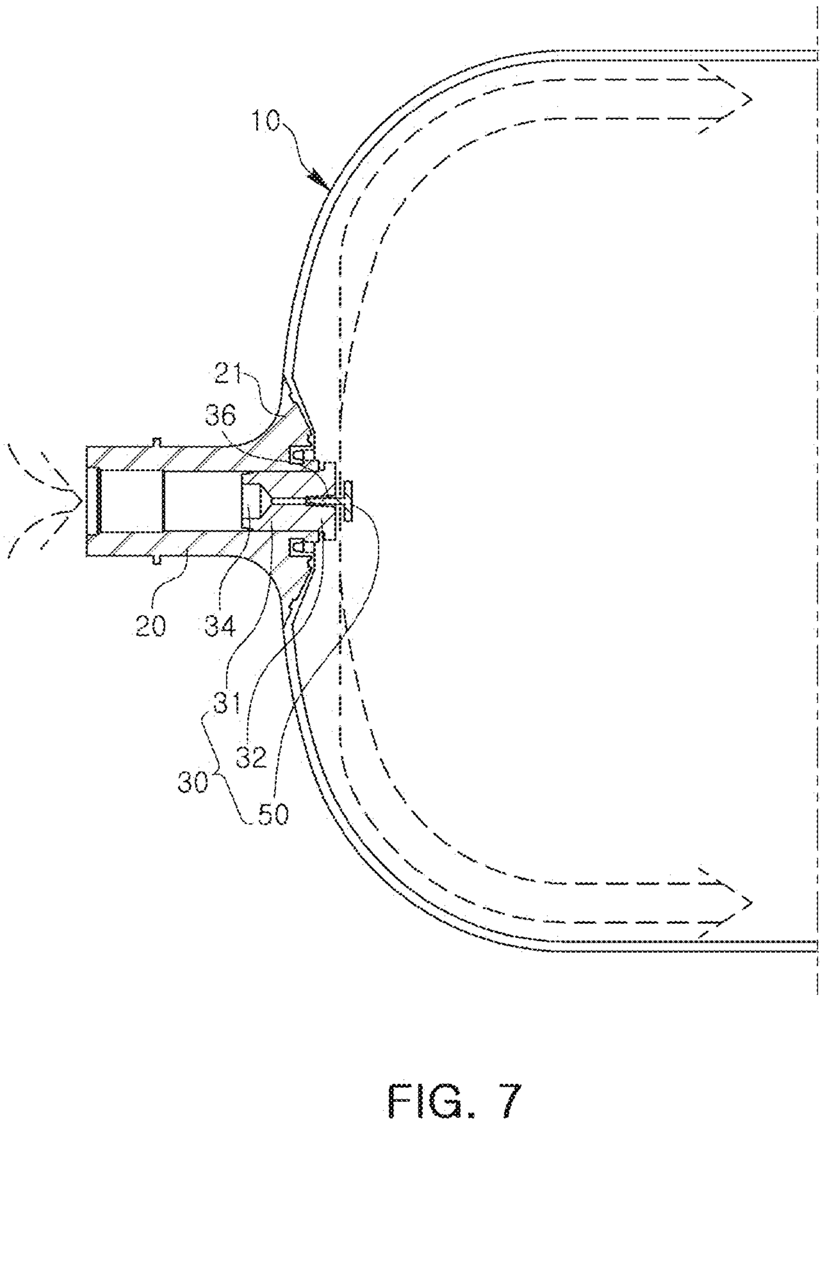
FIG. 7 is a partial cross-sectional view of a hydrogen tank to describe an operation of a hydrogen tank according to the third embodiment of the present disclosure.

FIG. 6 is a cutaway perspective view of a main portion of a hydrogen tank and an enlarged view of a changing member according to a third embodiment of the present disclosure. FIG. 7 is a partial cross-sectional view of a hydrogen tank to describe an operation of a hydrogen tank according to the third embodiment of the present disclosure.

The hydrogen tank according to the third embodiment of the present disclosure may include the tank body 10, the boss 20, and the nozzle 30.

The third embodiment illustrated in FIGS. 6 and 7 differs only in the configuration of the nozzle 30 and the addition of a changing member 50, and the other components are the same as those of the first or second embodiment. Accordingly, when describing the hydrogen tank of the third embodiment, the same reference numerals are given to the same components as those of the hydrogen tanks according to the first and second embodiments described above, and a detailed description of the configuration and function thereof has been omitted.

The nozzle 30 may be installed inside the tank close to one end of the tank body 10 via the boss 20 and may be formed and configured to spray hydrogen gas at a predetermined angle with respect to the axial direction of the tank body 10 inside the tank body 10. The nozzle 30 may be connected to the flow path inside the valve.

In the hydrogen tank according to the third embodiment of the present disclosure, the nozzle 30 may include the connector 31 coupled to the boss 20, the extension portion 32 extending parallel to the axial direction of the tank body 10 from the connector 31, and the changing member 50 provided at an end portion of the extension portion 32.

The connector 31 may have a hollow portion 34 therein and may have at least a partially formed male screw thread on an outer circumferential surface for coupling with the boss 20. Accordingly, the connector 31 may be screw-coupled to the boss 20. The hollow portion 34 may communicate with the flow path inside the valve and may have an inner diameter gradually decreasing toward the inside of the tank body 10.

The extension portion 32 may be formed as a tubular member and may have an outer diameter the same as or partially larger than an outer diameter of the connector 31. The extension portion 32 may be located to protrude from the boss 20 toward the internal surface of the tank body 10.

At least the connector 31 and the extension portion 32 may be integrally formed to form the nozzle 30. The orifice 35 having a predetermined diameter and communicating with the hollow portion 34 of the connector 31 may be formed inside the extension portion 32.

Selectively, the orifice 35 of the extension portion 32 may have an inner diameter gradually increasing toward the inside of the tank body 10.

The changing member 50 may be partially inserted into the orifice 35 of the extension portion 32 to be coupled to the extension portion 32. A spray flow path 36 may be formed between the orifice 35 of the extension portion 32 and the portion of the changing member 50 inserted into the orifice 35. In other words, the spray flow path 36 may be formed by a gap between the orifice 35 and the changing member 50 within the nozzle 30.

The changing member 50 may include a rod 51 formed to be inserted into the orifice 35 of the extension portion 32, and a diffuser plate 52 fixedly connected to an end portion of the rod 51.

The rod 51 may be formed to be inserted into the orifice 35 of the extension portion 32, fixed within the orifice 35, and protrude and extend from the orifice 35 by a predetermined length. The aforementioned spray flow path 36 is defined between an external surface of the rod 51 and an internal surface of the orifice 35, so that hydrogen gas introduced into the nozzle 30 may pass through the nozzle 30.

To this end, the rod 51 may include a plurality of support protrusions 53 spaced apart at equal intervals in the circumference of the rod 51 on the external surface and formed to extend in a length direction of the rod 51. In FIG. 6, three support protrusions 53 formed in the shape of ribs on the external surface of the rod 51 are illustrated, but the shape and number of the support protrusions 53 are not limited thereto.

In this manner, the rod 51 having the plurality of support protrusions 53 may be press-fit and fixed to the orifice 35 of the extension portion 32 and may be supported by the extension portion 32 while being spaced apart from the internal surface of the orifice 35 by the plurality of support protrusions 53.

The plurality of support protrusions 53 of the rod 51 and the internal surface of the orifice 35 may be fixed to each other by press fitting and may be additionally joined by welding or the like, thereby ensuring firm coupling between the changing member 50 and the extension portion 32.

The diffuser plate 52 may be fixed to the end portion of the rod 51 exposed from the orifice 35 of the extension portion 32 to the inside of the tank body 10.

The diffuser plate 52 may be formed in a plate shape and may be coupled to an end portion of the rod 51 to extend at a right angle with respect to the length direction of the rod 51. The diffuser plate 52 may have a substantially circular cross-sectional shape, but is not limited thereto, and may have any cross-sectional shape, such as a polygon. The diffuser plate 52 may have a larger area than the cross-sectional area of the orifice 35 of the extension portion 32.

The rod 51 and the diffuser plate 52 may be integrally formed to form the changing member 50. Hydrogen gas passing through the spray flow path 36 in the nozzle 30 may change in direction at a right angle, while hitting one side of the diffusion plate 52, and flow radially outward from the nozzle 30. As a result, the hydrogen gas may be radially diffused from the nozzle 30 by the changing member 50.

As shown in FIG. 7, the hydrogen gas diffused by the changing member 50 of the nozzle 30 may be guided by the inner wall of the tank body 10 to form a loop circulating throughout the interior of the tank body 10. Ultimately, in this way the uniformity of the temperature distribution in the hydrogen tank may be improved.

Therefore, by providing the changing member 50 having the diffusion plate 52, the nozzle 30 in the hydrogen tank according to the third embodiment of the present disclosure may evenly disperse and inject the hydrogen gas introduced through the valve and sprayed through the orifice 35 into the tank body 10.

In the hydrogen tank according to the third embodiment of the present disclosure, at least a portion of the valve and a portion of the nozzle 30 may be integrally formed. For example, a valve body of the valve and the connector 31 of the nozzle 30 may be integrally formed and connected to each other, the valve member, a solenoid, and the like may be assembled to the valve body, and the changing member 50 may be coupled to the extension portion 32.

Since the valve and the nozzle 30 may be integrated in this manner, the hydrogen tank according to the third embodiment of the present disclosure may reduce the number of parts and man-hours, thereby improving workability.

In the hydrogen tank according to the third embodiment of the present disclosure, by applying the nozzle 30 having a predetermined spray angle (right angle) therein, it is possible to suppress thermal stratification inside the hydrogen tank during filling of hydrogen gas and improve the uniformity of a temperature distribution, thereby preventing overheating.

In addition, in the hydrogen tank according to the third embodiment of the present disclosure, since overheating due to thermal stratification may be prevented, a temperature sensor or the like that monitors the temperature inside the hydrogen tank may be eliminated, thereby reducing costs. Furthermore, since overheating may be prevented, a filling speed of hydrogen gas may be improved, and the hydrogen tank may be utilized at maximum capacity.

The description is merely illustrative of the technical idea of the present disclosure, and various modifications and changes may be made by those having ordinary skill in the art without departing from the essential characteristics of the present disclosure.

For example, the aforementioned and illustrated embodiments of the present disclosure may be combined with each other, and each embodiment may selectively employ or replace some components of other embodiments as needed. Specifically, the injection member of the first embodiment or the second embodiment may be directly connected to the end portion of the extension portion without an inclined portion, as in the third embodiment.

According to an embodiment of the present disclosure, by providing the nozzle capable of dispersing and injecting hydrogen gas to be filled, the effect of suppressing thermal stratification and preventing overheating in the hydrogen tank during filling is obtained.

In addition, according to an embodiment of the present disclosure, since overheating due to thermal stratification may be prevented, a temperature sensor for monitoring the temperature in the hydrogen tank may be eliminated, thereby reducing costs.

In addition, according to an embodiment of the present disclosure, the valve and the nozzle may be integrated, thereby reducing the number of parts and man-hours to improve workability.

Accordingly, the embodiments disclosed in the present disclosure and the accompanying drawings are not intended to limit the technical: idea of the present disclosure but to describe the present disclosure, and the scope of the technical idea of the present disclosure is not limited by the embodiments and the accompanying drawings. The protection scope of the present disclosure should be interpreted by the following claims, and all technical ideas within the equivalent scope should be interpreted as being included in the scope of the present disclosure.

What is claimed is:

1. A hydrogen tank comprising:

a tank body;

a boss connected to at least one end of the tank body and having a skirt extending radially with respect to an axial direction of the tank body; and a nozzle installed inside the tank body via the boss and configured to spray hydrogen gas at a predetermined angle with respect to the axial direction of the tank body, wherein the nozzle includes:

a connector coupled to the boss;

an extension portion extending from the connector parallel to the axial direction of the tank body;

an inclined portion connected to an end portion of the extension portion and inclined with respect to the axial direction of the tank body; and an injection member provided at an end portion of the inclined portion, wherein the skirt has an inward surface formed toward an inside of the tank body, and wherein the inward surface has an inclined surface inclined at a first inclination angle with respect to a direction perpendicular to the axial direction of the tank body.

2. The hydrogen tank of claim 1, wherein the extension portion has an extension portion length, and the extension portion length is determined by the following equation:

$$le=rs/\cos\Psi 1$$

wherein le is the extension portion length, rs is a skirt radius, Ψ1 is the first inclination angle, and the skirt radius is defined as a shortest distance from a radial outermost edge of the skirt to an axial center line of the tank body.

3. The hydrogen tank of claim 2, wherein the inclined portion has an inclined portion length, and wherein the inclined portion length extending in a sloped state has the same value as the extension portion length.

4. The hydrogen tank of claim 1, wherein the inclined portion is inclined at a second inclination angle with respect to the axial direction of the tank body, and wherein the second inclination angle is in a range of 1.3-1.7 times the first inclination angle.

5. The hydrogen tank of claim 1, wherein the hydrogen tank is positionable such that the axial direction of the tank body is horizontal, and the inclined portion is inclined toward an upper portion of the tank body.

6. The hydrogen tank of claim 5, wherein the hydrogen tank includes a marking portion that is mounted on an external surface of the tank body and is configured to distinguish between a top and a bottom of the hydrogen tank.

7. The hydrogen tank of claim 1, wherein the injection member includes:

a plate connected to an end portion of the inclined portion and having a through-hole formed therein; and a diffusion guide extending from an edge of the plate and formed to spread out in a direction away from the plate.

8. The hydrogen tank of claim 7, wherein the diffusion guide is inclined so that an internal surface of the diffusion guide has a third inclination angle with respect to a surface of the plate, and wherein the third inclination angle has a range of 120-140°.

9. The hydrogen tank of claim 1, wherein the injection member includes:

a connecting body connected to an end portion of the inclined portion;

a main hole formed in an axial direction inside the connecting body; and a plurality of branch holes formed to be branched off and inclined from the main hole inside the connecting body.

10. The hydrogen tank of claim 9, wherein the plurality of branch holes are arranged at equal intervals in a circumferential direction of the connecting body.

11. The hydrogen tank of claim 9, wherein a branch hole of the plurality of branch holes is inclined at a fourth inclination angle having the same value as the first inclination angle with respect to an axial direction of the connecting body.

12. A hydrogen tank comprising:

a tank body;

a boss connected to at least one end of the tank body and having a skirt extending radially with respect to an axial direction of the tank body; and a nozzle installed inside the tank body via the boss and configured to spray hydrogen gas at a predetermined angle with respect to the axial direction of the tank body, wherein the nozzle includes:

a connector coupled to the boss;

an extension portion extending from the connector parallel to the axial direction of the tank body; and a changing member provided at an end portion of the extension portion, wherein the extension portion has an orifice formed therein, wherein the changing member includes:

a rod formed to be inserted into the orifice; and a diffuser plate fixedly coupled to an end portion of the rod, and wherein the rod includes a plurality of support protrusions spaced apart at equal intervals in a circumferential direction of the rod on the external surface of the rod and extending in a length direction of the rod.

13. The hydrogen tank of claim 12, wherein the orifice has an inner diameter gradually increasing toward an inside of the tank body.

14. The hydrogen tank of claim 13, wherein a spray flow path is defined between an external surface of the rod and an internal surface of the orifice.

15. The hydrogen tank of claim 12, wherein the rod is press-fitted and coupled to the orifice.

16. A hydrogen tank comprising:

a tank body;

a boss connected to at least one end of the tank body and having a skirt extending radially with respect to an axial direction of the tank body; and a nozzle installed inside the tank body via the boss and configured to spray hydrogen gas at a predetermined angle with respect to the axial direction of the tank body, wherein the nozzle includes:

a connector coupled to the boss;

an extension portion extending from the connector parallel to the axial direction of the tank body; and a changing member provided at an end portion of the extension portion, wherein the extension portion has an orifice formed therein, wherein the changing member includes:

a rod formed to be inserted into the orifice; and a diffuser plate fixedly coupled to an end portion of the rod, and wherein the diffuser plate is coupled to extend at a right angle with respect to a length direction of the rod, and the diffuser plate has an area larger than a cross-sectional area of the orifice.

* * * * *